(12) United States Patent
Larsson (10) Patent No.: US 6,419,142 B1
(45) Date of Patent: Jul. 16, 2002

(54) APPARATUS FOR FRICTION STIR WELDING

(75) Inventor: Rolf Larsson, Laxå (SE)

(73) Assignee: ESAB AB (SE)

( * ) Notice: Subject to any disclaimer, the term of this patent is extended or adjusted under 35 U.S.C. 154(b) by 0 days.

(21) Appl. No.: 09/582,005

(22) PCT Filed: Dec. 18, 1998

(86) PCT No.: PCT/SE98/02390
§ 371 (c)(1),
(2), (4) Date: Aug. 30, 2000

(87) PCT Pub. No.: WO99/34951
PCT Pub. Date: Jul. 15, 1999

(30) Foreign Application Priority Data

Dec. 19, 1997 (SE) .............................. 9704800

(51) Int. Cl.⁷ .......................... B23K 20/12; B23K 37/04
(52) U.S. Cl. ...................... 228/2.1; 228/44.3; 228/112.1
(58) Field of Search .............................. 228/2.1, 112.1, 228/212, 44.3

(56) References Cited

U.S. PATENT DOCUMENTS

| | | | |
|---|---|---|---|
| 4,650,954 A | | 3/1987 | Frings et al. ............... 219/121 |
| 5,697,544 A | * | 12/1997 | Wykes |
| 5,971,247 A | * | 10/1999 | Gentry |
| 6,050,474 A | * | 4/2000 | Aota et al. |
| 6,173,880 B1 | * | 1/2001 | Ding et al. |
| 6,237,829 B1 | * | 5/2001 | Aota et al. |
| 6,237,835 B1 | * | 5/2001 | Litwinski et al. |
| 6,257,479 B1 | * | 7/2001 | Litwinski et al. |

FOREIGN PATENT DOCUMENTS

| | | | |
|---|---|---|---|
| DE | 1116034 | 10/1958 | |
| DE | 1627555 | 1/1971 | |
| DE | 4441539 | 6/1996 | ............ B23K/37/04 |
| EP | 0787043 | 9/1997 | .............. F16K/1/02 |
| EP | 0810055 | 12/1997 | ............ B23K/20/12 |
| EP | 0928659 A1 | * 7/1999 | |
| JP | 2000153374 A | * 6/2000 | |
| SE | 362813 | 12/1973 | ............ B23K/37/04 |
| SE | 407914 | 4/1979 | ............ B23K/37/02 |

OTHER PUBLICATIONS

WO 99/34951 Larsson (Jul. 15, 1999).*
WO 97/48517 Larsson (Dec. 24, 1997).*
WO 98/13167 Larsson (Apr. 2, 1998).*
WO 98/45080 Knipstrom et al. (Oct. 15, 1998).*

* cited by examiner

Primary Examiner—Tom Dunn
Assistant Examiner—Kiley Stoner
(74) Attorney, Agent, or Firm—Orum & Roth (57) ABSTRACT

The invention concerns an apparatus for friction stir welding, comprising a welding unit including a welding head, a worktable including a backing unit to support the workpieces to be welded together along their joint line, and clamping means to clamp the workpieces to the worktable in a direction towards one another during the welding operation. The backing unit consists of at least two backing parts or of at least one backing part and one additional welding head, said backing parts being freely exchangeable, one for the other, before each welding operation as is also each backing part freely exchangeable for the additional welding head, and vice versa.

20 Claims, 6 Drawing Sheets

APPARATUS FOR FRICTION STIR WELDING

The present invention relates to an apparatus for friction stir welding, comprising a welding unit including a welding head, a worktable including a backing unit to support the workpieces to be welded together along their joint line, and clamping means to clamp the workpieces to the worktable during the welding operation.

The definition friction stir welding designates a welding method according to which the workpieces to be joined together are plasticized along their joint line by supply of frictional heat from a rotating welding probe, the rotational axis of which extends essentially at right angles to the surface of the workpiece, and said welding probe is mounted on a welding head, which displaces the welding probe along the joint between the workpieces while at the same time it is being pressed against the workpieces. As described in WO93/10935 and WO95/26254, the welding probe should be manufactured from a harder material than the workpieces, and during the welding operation the workpieces should be securely fixed relative to one another and to the worktable. In this respect this technique differs from that of conventional friction welding, according to which the frictional heat is generated by the relative motion of the workpieces as they are being pressed together, i.e. the frictional heat is generated only by the two components to be joined together. The configuration of the welding probe is conditional e.g. on the nature of the material to be welded and on the intended application.

The friction stir welding technique is particularly suitable for welding together aluminium profile sections for construction of large-size aluminium plating intended for example for hulls. The reason therefor is that this welding technique produces a welded joint the bottom face of which has a fine and smooth finish, with resulting few points of load concentration. In addition, the strength of the joint produced by this joining method is almost equal to that of the basic material. The considerable forces to which the workpieces are exposed during the very welding operation do, however, place considerable demands upon the stability of the worktable and on the ability of the clamping means to fix the workpieces in position.

In addition, this welding technique can only be used to join together workpieces that are separated by a very narrow air gap. Should the air gap exceed this critical value, which among other things depends on the thickness of the profile sections, a joint is produced having internal cavities and impaired strength. In consequence thereof, extruded aluminium profile sections that cannot be produced to exactly precise dimensions by existing manufacturing methods, sometimes require some pre-treatment to avoid too large gaps between the profile sections. This is particularly important in the case of the welding together of elongate profile sections, in which even small deformations may give rise to unacceptable deviations.

Considering that deformations in the profile sections may occur also during the friction stir welding operation proper, since the sections are exposed to the effects of heat, the dimensions of the end product may fail to be within the acceptable tolerance range, despite the pre-treatment of the profile sections. The deformations are smaller than in the case of MIG and TIG welding, since the temperature never reaches the fusing point.

Another consequence of the critical size of the air gap is that the workpieces must not move relative to one another once they have been fixed in this correct welding position. In other words, high demands are placed also on the ability of the clamping means to fix the positions of the workpieces. Considering that the welding probe must be in contact with both workpieces during the welding operation, high demands are placed also on the running accuracy of the welding head.

In order to meet the above criteria, a complex and consequently expensive welding apparatus is required.

In addition, in order to ensure a reasonable repayment period for an investment of this magnitude, another requirement is that the welding apparatus possess a high degree of availability, which means that the time required to adjust the welding apparatus to the configuration of the workpieces, the thickness of the material, the desired appearance of the intended joint, for example as a corner joint, etcetera, in principle should be negligible while at the same time the above-mentioned demands concerning the small air-gap size etcetera should be met. This is a considerable problem in workshops, where one wishes for example to weld together hollow profile sections during part of the working day and solid workpieces having identical or different material thickness during another part of the day, without having to resort to time-consuming re-setting operations when shifting from one mode of operation to another, while at the same time the production of a high-precision welded joint to be formed along the joint line of the workpieces must be guaranteed.

The object of the present invention therefore is to make it possible to weld together workpieces of various configurations by means of the above welding apparatus without requiring time-consuming re-settings.

This object is achieved in accordance with the teaching of the present invention by means of a welding apparatus of the kind defined in the introduction hereto and which is characterised in that the backing unit consists of at least two backing parts or of at least one backing part and one additional welding head, said backing parts being freely exchangeable, one for the other, at each welding operation as is also each backing part for an additional welding head, and vice versa.

Owing to the two-part design of the welding apparatus backing unit, consisting of at least two backing parts or of at least one backing part and one additional welding head, it becomes possible, during operation, to rapidly re-set the welding apparatus before each welding operation, from a welding mode according to which solid workpieces the material of which is of equal or different thickness are welded together, to a welding mode according to which workpieces in the form of hollow profile sections are welded together.

The backing parts and/or the additional welding head may be displaceable in a direction perpendicular to the joint line of the workpieces.

The welding unit and the clamping means may be displaceable in a direction perpendicular to the direction of movement of the welding unit relative to the backing unit in order to allow the joint line of the workpieces to be changed. At least one backing part may be formed with an even-level upper face or with a stepped upper face. One backing part may be a separate backing element, such as a bottom backing element, or else two backing parts may be formed by two backing pieces, such as bottom element pieces. In addition, the backing unit may consists of at least one separate backing element and at least two backing pieces.

It is likewise possible for the backing unit to consist of three different backing elements, one of which could in this case be formed with a plane upper face whereas the other two backing elements be formed with a stepped upper face, the steps of the latter backing elements being of different heights.

The welding apparatus may be fitted with a means for shifting the additional welding head from a position below the joint line of the workpieces to a position above said line. The additional welding head preferably is a friction stir welding head.

One of the friction stir welding heads could be arranged to alternatively serve as a milling head. This arrangement makes it possible to perform a milling operation prior to and/or following each separate welding operation, which ensures acceptable tolerance ranges in the discrete workpieces as well as in the finished product without the workpieces or product having to be passed through any external pre- or post-treatment unit. Owing to the milling step, the workpieces will be given such a degree of straightness that any inter-workpiece air gaps will not exceed the value at which a faulty joint is produced.

The invention will be described in more detail in the following with reference to the accompanying drawings, which for exemplifying purposes show various embodiments of a welding apparatus in accordance with the present invention.

Figure 1:
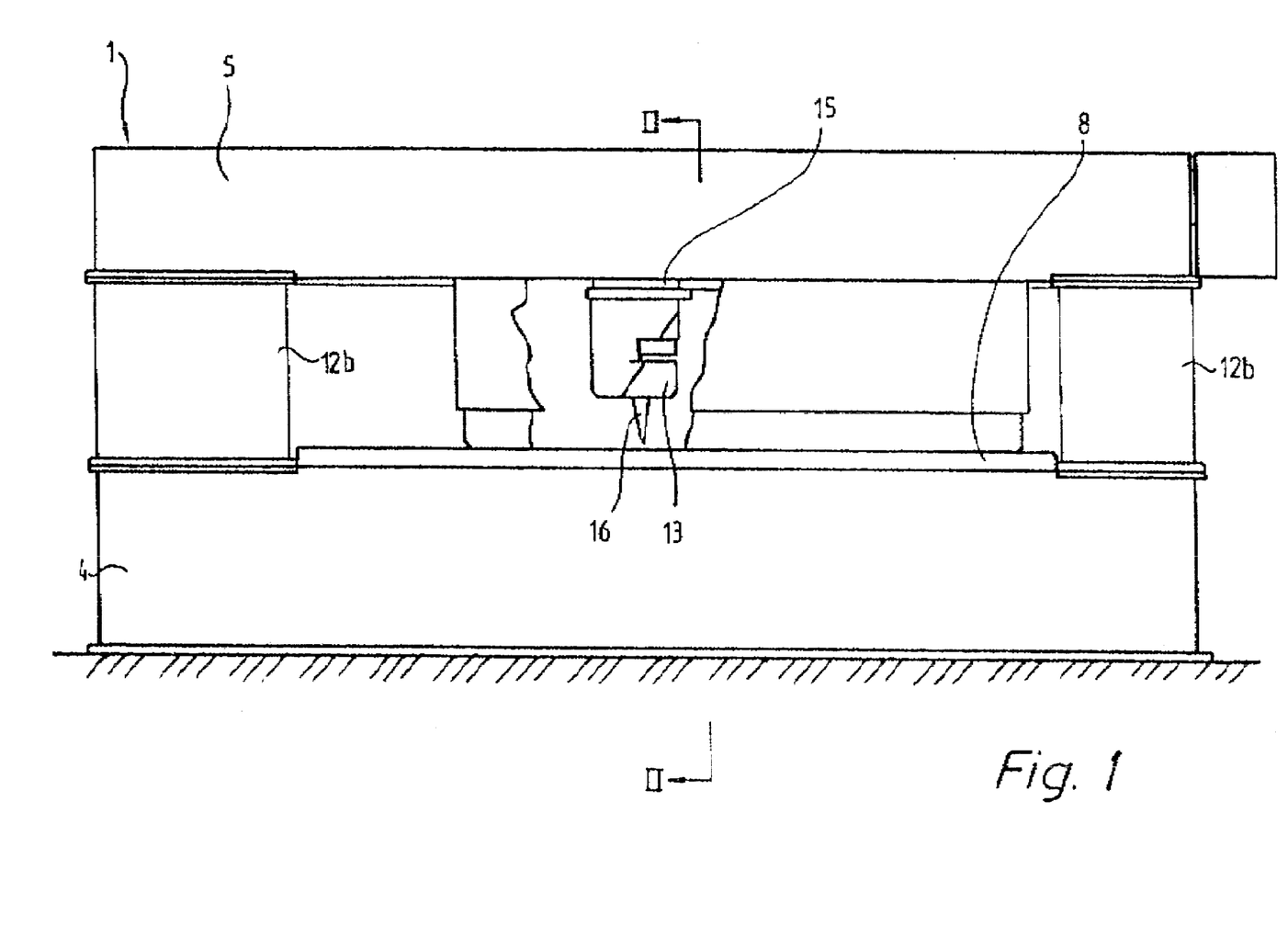
FIG. 1 is a view from the front of a welding apparatus in accordance with a first embodiment.
Figure 2:
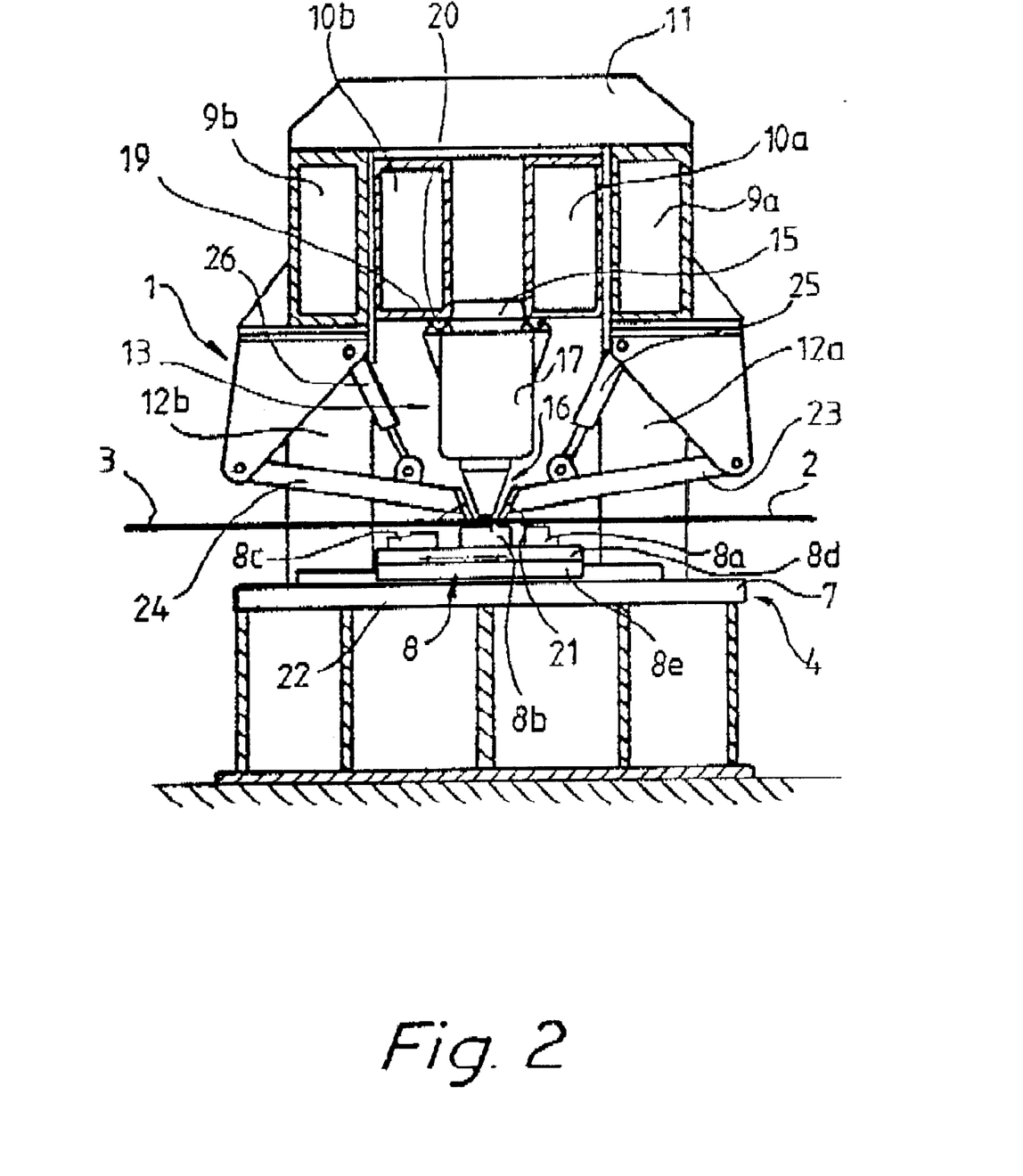
FIG. 2 is a cross-sectional view of the welding apparatus of FIG. 1, the section being taken on line II—II.

The welding apparatus 1 illustrated in FIGS. 1 and 2 is intended for welding together two workpieces 2 and 3, such as aluminium profile sections or steel plates, to form an intermediate or final product, such as an aluminium or steel panel. The apparatus comprises a worktable 4, an upper machine frame 5 supported on the worktable, and a welding unit 6. In the subject case the worktable consists of a stationary, stable and horizontal machine table 7, on which a backing unit 8 is mounted for movement transversely across the direction of advancement of the welding unit. The backing unit 8 consists of three separate backing elements 8a, 8b and 8c, which are stationarily mounted on a mobile plate 8d, the latter in turn being mounted on a plate 8e, which is stationarily mounted on the machine table. Lateral movements of plate 8d relative to plate 8e could be effected e.g. by means of a pressure cylinder, not shown. Securing means, not shown, do, however, prevent the plate 8d from being displaced laterally during the welding operation proper.

The machine frame 5 consists of an outer pair of beams 9a and 9b and an inner pair of beams 10a and 10b, the beams 9a and 9b of the outer pair being connected to the beams 10a and 10b of the inner pair by means of bolt connections, not shown, provided at the respective outer beam-ends. The beams 9a and 9b of the outer pair are also interconnected by means of a yoke 11 and they rest on the machine table 7 by means of two pillars 12a and 12b each, positioned at the outer ends of the beams.

In this embodiment the welding unit 6 consists of a friction stir welding head 13, which is mounted on a carriage 15, the latter being disposed on the inner pair of beams 10a and 10b for movement thereon. The carriage is displaceable along the joint line of the workpieces by means of a drive unit, such as a motor, not shown. The friction stir welding head 13 is fitted with a guide mechanism, not shown, and, as appears from FIG. 3a, with a welding probe 16 consisting of a frustro-conical body 16a and a pin 16b joined thereto, and during the welding operation, said pin is positioned between the workpieces in contact with those edges thereof that are to be joined together. The upper part of the body is connected to a rotating spindle 17, which is driven by a drive unit, such as a drive motor, not shown. The body and the pin of the welding probe could be configured e.g. in conformity with any of the embodiments illustrated in WO93/10935 or in WO95/26254.

Two guide shoes 19a and 19b interconnect the carriage 15 and the beams 10a and 10b, respectively, of the inner pair of beams, and the shoes are arranged to run along two beam-mounted guide rails 20a and 20b, respectively. This arrangement produces a rectilinear motion relative to the machine frame 5 and the worktable 4.

During welding, the clamping means 21 and 22 press the workpieces 2 and 3, respectively, against the worktable 4 in the direction towards one another. Each clamping means 21 and 22 consists of a triangular pressure member, which via two arms 23 and 24, respectively, are pressed into engagement with the associated workpiece 2 and 3, respectively, during welding, by means of pressure cylinders 25 and 26, respectively. The pressure cylinders 25 and 26 are connected to the machine frame 5. The clamping means are positioned opposite one another in pairs along the edges of the joint between the workpieces. According to the present embodiment, the distance between the centre lines of two neighbouring pairs is about 500 mm.

Figure 3A:
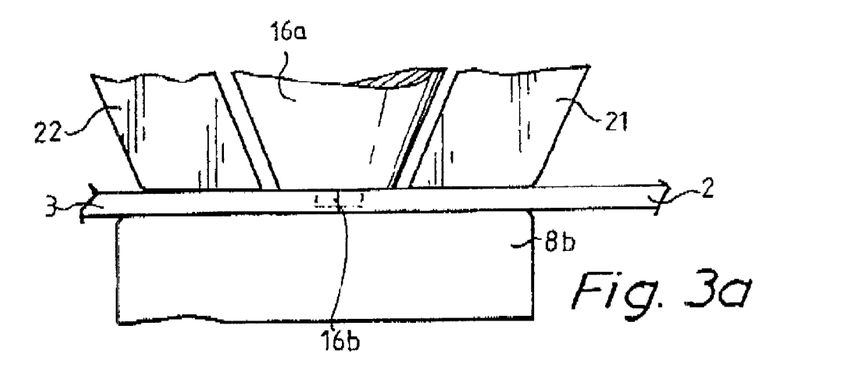
FIGS. 3a, 3b and 3c are enlarged views of a portion of the welding apparatus of FIG. 2, showing the backing unit of the welding apparatus in different positions.
Figure 3B:
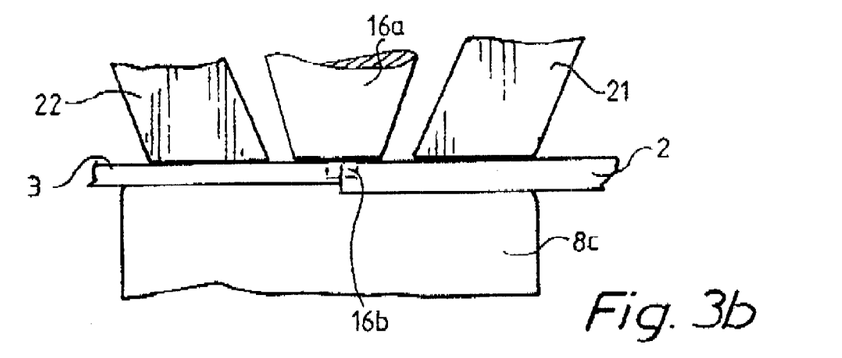
Figure 3C:
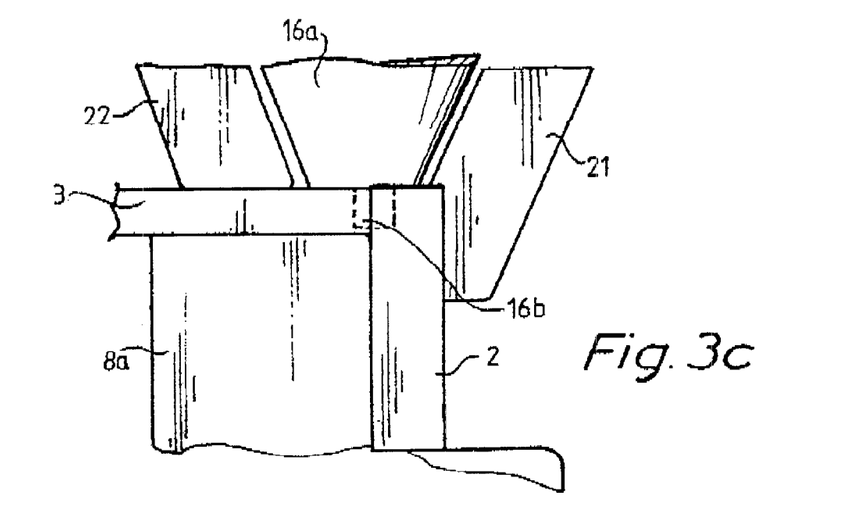

As appears from FIG. 3a, the backing element 8b is formed with a plane upper face, against which abut the lower faces of the workpieces during the friction stir welding performed by the welding probe 16. To produce an article having an even upper face this variety of the backing element therefore may be used only to weld together workpieces of identical material thickness. On the other hand, when the thickness of the material of the workpieces varies, the backing element 8c formed with a stepped upper surface is used instead, see FIG. 3b, the height of the step in the backing element equalling the difference in thickness. For workpieces that are to be joined together by means of a corner joint, backing element 8a is used, wherein the height of the step has been adapted to the width of the workpiece 2. Depending on the configuration of the workpieces to be welded together, the plate 8d is displaced, in-between the welding operations, relative to the joint line of the workpieces, thus ensuring that the workpieces are supported by a correctly configured backing element during the welding.

Figure 4A:
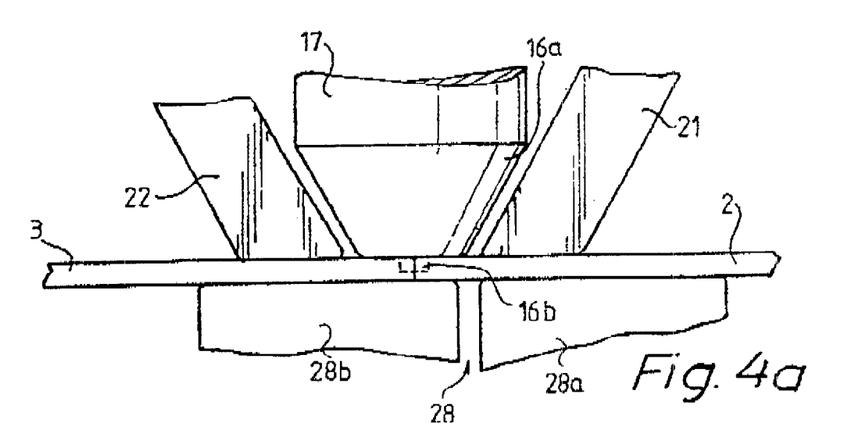
FIGS. 4a and 4b show a second embodiment of the welding apparatus, the latter assuming its friction stir welding and milling positions, respectively.
Figure 4B:
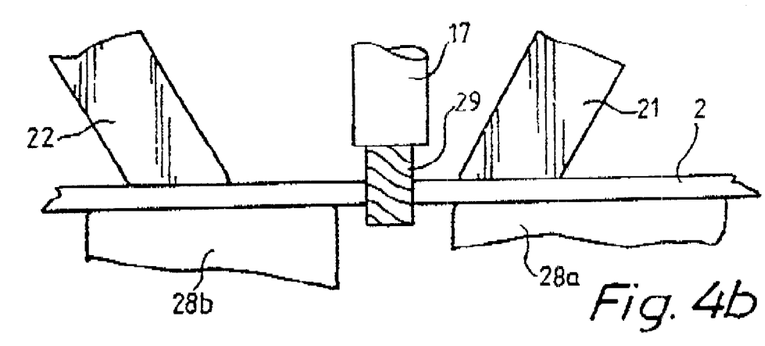

FIGS. 4a–4b, on the other hand, show a two-piece backing element 28, the two backing parts of which consist of two backing pieces 28a and 28b. In accordance with this embodiment of the welding apparatus, these are formed with plane upper surfaces. Also, these backing element pieces are movable relative to one another and according to this very embodiment the left-hand piece 28b is stationarily mounted on the machine table 7, whereas the right-hand piece 28a is movably mounted thereon. In accordance with FIG. 4a the right-hand backing element piece 28a is located as close as possible to the left-hand piece 28b, and in this position only a narrow air gap exists between the backing element pieces. In the following, this position will be referred to as the innermost position. According to FIG. 4b, the right-hand backing element piece assumes a position as far away as possible from the left-hand backing element piece, and in the following this position will be referred to as the outermost position. In FIG. 4c, finally, the right-hand backing element piece assumes a position in between the outermost and the innermost positions, and this position will be referred to in the following as the middle position.

When the friction stir welding technique is used, the joint between the workpieces shall, as pointed out previously, be located on a completely plane surface, i.e. the gap between the backing element pieces should be as small as possible and consequently the pieces assume their innermost position, see FIG. 4a. Since a smaller air gap exists between the backing element pieces also in this position, it follows that the workpiece edges to be joined together also must be located on one and the same backing element piece 28b during the friction stir welding performed by means of the welding probe 16. This is quite simply due to the fact that according to this welding technique, the upper face of the backing element piece serves as a mould to the material that is being plasticized around the joint line.

When, on the other hand, the welding apparatus is to be used to trim-mill the workpieces, the friction stir welding probe is replaced in accordance with this embodiment by a milling tool 29, which thus is supported by the friction stir welding head 13. This becomes possible because a friction stir welding head in principle is configured like a milling head and furthermore possesses sufficient motor power and stability to be able to rotate a milling tool instead of a friction stir welding probe. In order not to damage the upper faces of the backing element pieces, since in a subsequent friction stir welding operation these surfaces are to serve as a welding-joint mould, the backing element pieces 28a and 28b should in this case be positioned in their outmost position, see FIG. 4b. The milling tool 29 then assumes a position intermediate the workpiece edges to be joined together.

Figure 5:
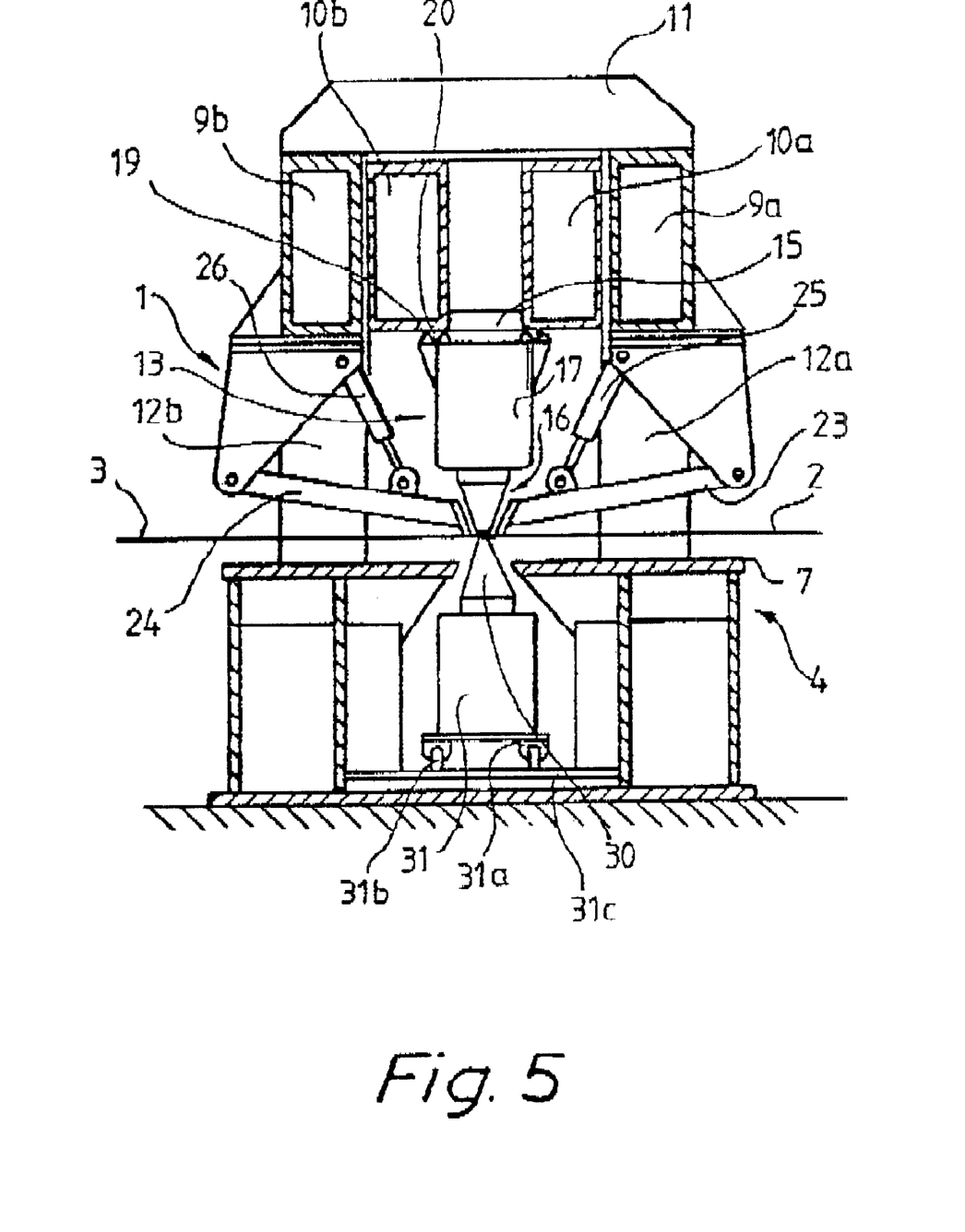
FIG. 5 is a cross-sectional view of a third embodiment of the welding apparatus.

FIG. 5 illustrates an alternative embodiment of the welding apparatus according to which the backing unit consists of an additional friction stir welding head 30. Alternatively, the backing unit could also consist of an additional friction stir welding head and a backing part, for instance in the form of a separate backing element. It is placed in front of the friction stir welding head 13 but on the opposite side of the joint line between the workpieces 2, 3. The additional friction stir welding head 30 is supported by a separate carriage 31, which by means of a drive unit, not shown, may be displaced along the joint line during the welding. In accordance with this modified embodiment, the machine table 7 is formed with an inner cavity wherein are located the welding head 30 and the carriage 31. To ensure that the welding head probe assumes the same position relative to the joint line of the workpieces along the entire joint, the carriage 31 is connected to the machine table by means of two guide shoes 31a arranged to run along two guide rails 31b. In turn, the latter are connected to the machine table via a beam 31c. Owing to this arrangement, a rectilinear movement is produced relative to the worktable 4. This alternative embodiment is particularly suitable to weld together hollow profile sections. It may also be used to weld together solid workpieces the material thickness of which exceeds 10 mm. It is likewise possible to replace the welding head 30 and the carriage 31 by a stationary backing element, which is placed on the guide rails 31b, or by a movable backing roller.

Figure 6:
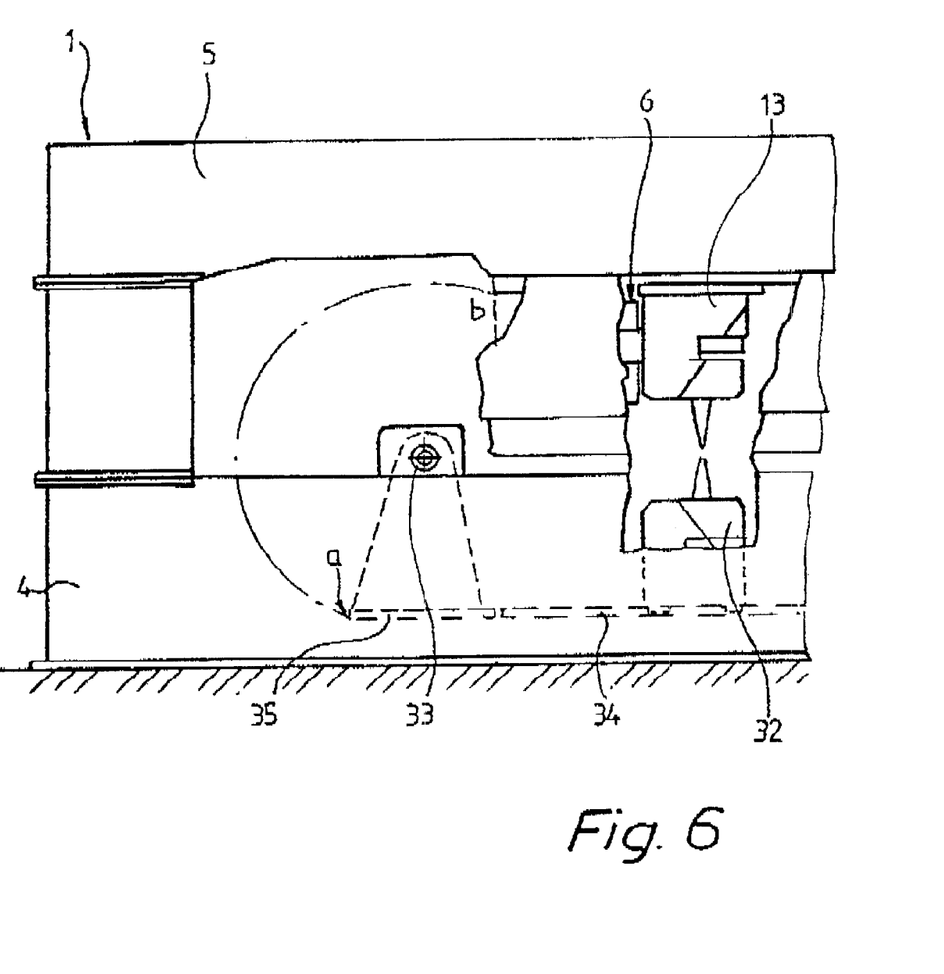
FIG. 6 is a view from the front of a welding apparatus in accordance with a fourth embodiment.

FIG. 6, finally, shows one embodiment of the welding apparatus according to which the backing unit consists of an additional friction stir welding head 32, like in the embodiment of FIG. 5. Also this head is placed in front of the friction stir welding head 13 although on the opposite side of the joint line between the workpieces 2 and 3. The friction stir welding head 32 is displaced along the joint line during the welding operation, for example by means of a carriage, not shown, of a kind similar to carriage 31. The additional friction stir welding head 32 is, however, arranged to be displaced by a means 33 in the shape of a cradle, from the position it assumes in this drawing figure to a position above the joint line of the workpieces. The welding head and the cradle 33 are provided with guides 34 and 35, respectively, whereby it becomes possible to transfer the additional welding head 32 from the carriage to the cradle, whereafter it may be pivoted over up to 180° following disconnection of all connecting means. In this position, point a meets point b, and thereafter it becomes possible to place the welding head on the same track as the upper friction stir welding head 13. To replace the lower friction stir welding head 32 it becomes necessary to place, on top of the machine table 7, for example a backing unit of the same kind as that shown in FIG. 2. By placing both welding heads above the joint line of the workpieces, in the centre of said line, and thereafter moving the welding heads in the direction towards the end points of the joint line, it thus becomes possible to perform the welding-together the workpieces in question in half the time compared with that required when there is only one welding head above the workpieces. Because the additional welding head is capable of either serving as a backing unit or be part of the welding unit, the resulting welding apparatus is extremely flexible.

When the workpieces 2 and 3 are to be welded together to produce the product to be manufactured, workpieces are secured in the welding apparatus 1 with the aid of the clamping means 21 and 22. Depending on the quality of the workpiece edges to be joined together, i.e. whether they possess an acceptable degree of straightness or not, the workpieces are positioned either in the milling position, see FIG. 4b, or in the welding position according to FIG. 4a. Should the edges be deficient, the workpieces therefore are secured in the milling position, in which position their edges to be joined together abut against the outer face of the milling tool 29, and in this case the friction stir welding probe 16 is replaced by the milling tool. The milling operation is then started by rotation of the milling tool at a predetermined speed while at the same time the tool is moved at a predetermined speed along the edges to be joined together.

When the milling tool has traversed the entire joint and the individual milling operation thus is completed, the pressure cylinders 25 and 26 are activated, allowing the workpieces to be released from the clamping means 21 and 22, if the workpieces, following the milling operation, are to be welded together with the use of the friction stir welding technique. By activation of said pressure cylinders, the workpieces 2 and 3 may thereafter be fixed in the position shown in FIG. 4a. It is likewise possible to fasten the second workpiece already from the start in such a manner that it may be secured in the same position during both the milling and the friction stir welding operations, i.e. following the milling step only the left-hand pressure cylinder 26 need be activated for release and subsequent clamping of the left workpiece 3. The milling tool is thereafter exchanged for the friction stir welding probe, which is caused to rotate at a predetermined speed while at the same time it is being moved along the gap at a predetermined speed. As explained in the introduction hereto, the workpiece edges to be joined together will be plasticized by the frictional heat generated in this process, while at the same time they will be pressed against the worktable. After solidification, a homogeneous welded joint is formed, possessing high-strength qualities. When the friction stir welding probe 16 has traversed the entire joint and the individual welding operation thus is completed, the pressure cylinders 25 and 26 are again activated, causing deactivation of the clamping means 21 and 22, and consequently release of the formed product.

If the desired product is to comprise more than two workpieces, it may be necessary to perform milling in between each welding operation in order to produce a high-quality end product.

It should be appreciated that the invention is not limited to the above embodiments but that numerous modifications are possible within the scope of the appended claims. For example, the welding probe may be automatically instead of manually exchangeable for the milling tool with the aid of a tool switching device, not shown. Instead of the movable backing unit shown in FIG. 2 it is of course possible to design the welding apparatus in such a manner that its welding unit, the clamping means and the workpieces are arranged to be displaced laterally relative to the backing unit. In order to further increase the capacity of the welding apparatus a number of friction stir welding heads could be placed above and/or underneath the workpieces. The welding head/heads could be fitted with special mounting and transportation means in order to facilitate the shifting of the various welding heads between different welding apparatuses. It is likewise possible to use a pallet or transfer carriage system to move and connect the welding heads to different welding apparatuses.

In the description above, the starting position wherein a backing unit in the form of a backing element and a welding head operating vertically above said element has been used, but obviously the welding may be performed from below, against a backing unit positioned in contact with the upper face, or with vertically orientated workpieces and horizontally directed welding. In a welding apparatus of FIG. 5, the upper head could in this case be replaced by a backing unit and the welding be performed from underneath. It is likewise possible to arrange the welding apparatus in such a manner that a fusion welding head is used on the upper face and a friction welding head on the lower one.

What is claimed is:

1. An apparatus (1) for friction stir welding, comprising a welding unit (6) including a welding head (13, 14), a worktable (4) including a backing unit (8; 28; 30; 32) to support the work pieces (2, 3) to be welded together along their joint line, and clamping means (21, 22) to clamp the workpieces to the worktable in a direction towards one another during the welding operation, characterised in that the backing unit consists of at least two backing parts (8a, 8b, 8c; 28a, 28b) or of at least one backing part (8a, 8b, 8c; 28a, 28b) and one additional welding head (30; 32), said backing parts being freely exchangeable, one for the other, before each welding operation as is also each backing part freely exchangeable for the additional welding head, and vice versa.

2. An apparatus as claimed in claim 1, characterised in that at least one of the backing parts (8a, 8b, 8c; 28a, 28b) and/or the additional welding head (30; 32) is/are displaceable in a direction perpendicular to the joint line of the workpieces (2, 3).

3. An apparatus as claimed in claim 2, characterized in that one backing part is a separate backing element (8a, 8b, 8c).

4. An apparatus as claimed in claim 2, characterized in that two backing parts are formed by two backing pieces (28a, 28b).

5. An apparatus as claimed in claim 2, characterized in that the welding unit (6) and the clamping means (21, 22) are displaceable in a direction perpendicular to the direction of movement of the welding unit relative to the backing unit (8; 28; 30; 32) in order to allow displacement of the joint line of the workpieces (2, 3).

6. An apparatus as claimed in claim 2, characterized in that at least one backing part (8b; 28a, 28b) has a plane upper face.

7. An apparatus as claimed in claim 2, characterized in that at least one backing part (8a, 8b) has a stepped upper face.

8. An apparatus as claimed in claim 2, characterized by a means (33) for shifting the additional welding head (32) from position underneath the joint line of the workpieces (2, 3) to a position above said line.

9. An apparatus as claimed in claim 2, characterized in that at least one welding head (13) is arranged to alternatively serve as a milling head.

10. An apparatus as claimed in claim 1, characterised in that one backing part is a separate backing element (8a, 8b, 8c).

11. An apparatus as claimed in claim 1, characertised in that two backing parts are formed by two backing pieces (28a, 28b).

12. An apparatus as claimed in claim 7, characterized in that the backing unit consists of at least one separate backing element (8a, 8b, 8c) and of at least two backing pieces (28a, 28b).

13. An apparatus as claimed in claim 1, characterised in that the welding unit (6) and the clamping means (21, 22) are displaceable in a direction perpendicular to the direction of movement of the welding unit relative to the backing unit (8; 28; 30; 32) in order to allow displacement of the joint line of the workpieces (2, 3).

14. An apparatus as claimed in claim 1, characterised in that at least one backing part (8b; 28a, 28b) has a plane upper face.

15. An apparatus as claimed in claim 1, characterised in that at least one backing part (8a, 8b) has a stepped upper face.

16. An apparatus as claimed in claim 1, characterised by a means (33) for shifting the additional welding head (32) from a position underneath the joint line of the workpieces (2, 3) to a position above said line.

17. An apparatus as claimed in claim 1, characterised in that at least one welding head (13) is arranged to alternatively serve as a milling head.

18. An apparatus as claimed in claim 10, characterised in that the backing unit consists of at least one separate backing element (8a, 8b, 8c) and of at least two backing pieces (28a, 28b).

19. An apparatus as claimed in claim 10, characterised in that the backing unit consists of three separate backing elements (8a, 8b, 8c).

20. An apparatus as claimed in claim 19, characterised in that one (8b) of the backing elements is formed with a plane upper face and in that the two other backing elements (8a, 8c) are formed with a stepped upper face, the steps of the two latter backing elements being of different heights.

* * * * *